(12) United States Patent
Bosik et al.

(10) Patent No.: US 7,627,322 B1
(45) Date of Patent: *Dec. 1, 2009

(54) METHOD FOR CALL FORWARDING A CALL FROM A MOBILE TELEPHONE

(75) Inventors: Barry S. Bosik, Marlboro, NJ (US); James Ehlinger, Colts Neck, NJ (US); Amit Garg, Howell, NJ (US); Rajeev B. Patil, Holmdel, NJ (US)

(73) Assignee: AT&T Corp., New York, NY (US)

( * ) Notice: Subject to any disclaimer, the term of this patent is extended or adjusted under 35 U.S.C. 154(b) by 380 days.

This patent is subject to a terminal disclaimer.

(21) Appl. No.: 11/702,366

(22) Filed: Feb. 5, 2007

Related U.S. Application Data

(63) Continuation of application No. 10/922,444, filed on Aug. 19, 2004, now Pat. No. 7,194,268, which is a continuation of application No. 10/027,003, filed on Dec. 20, 2001, now Pat. No. 6,856,806.

(51) Int. Cl.
*H04W 40/00* (2009.01)

(52) U.S. Cl. .............. 455/445; 455/404.2; 455/456.1; 455/417; 379/211.01; 379/211.02; 379/201.06; 379/201.07; 379/201.08

(58) Field of Classification Search ................. 455/445, 455/404.2, 456.1, 417; 379/217.4, 201.06–201.08, 379/211.01, 211.02
See application file for complete search history.

(56) References Cited

U.S. PATENT DOCUMENTS

| 5,933,488 | A | * | 8/1999 | Marcus et al. ......... 379/217.01 |
| 6,038,451 | A | * | 3/2000 | Syed et al. ................. 455/445 |

* cited by examiner

*Primary Examiner*—Patrick N Edouard
*Assistant Examiner*—Wayne Cai

(57) ABSTRACT

A method of call forwarding a call originally placed to a mobile telephone number of a mobile telephone to a landline telephone number of a landline telephone is provided, wherein the call is routed through a telephone network by a service provider. A forwarding location of the mobile telephone is determined using a mobile location technology. The landline telephone number of the landline telephone is provided to the service provider. A current mobile telephone location is determined by a mobile location technology. The mobile location technology is capable of locating the mobile telephone using service provider equipment. The service provider determines that the call is being made to the mobile telephone when the current mobile telephone location is at the forwarding location. The call to the mobile telephone number is forwarded to the landline telephone number when the current mobile telephone location is at the forwarding location.

12 Claims, 13 Drawing Sheets

FIG. 15

| LOCATION | COORDINATES | | LAND-LINE NO. | | | | |
|---|---|---|---|---|---|---|---|
| | LAT. | LONG. | | | | | |
| 124 — PRIMARY RESIDENCE | N40.5639 | W74.1479 | 01 | 52 | 908 | 555 | 1234 |
| 224 — SECONDARY RESIDENCE | N40.5631 | W74.1472 | 01 | 52 | 908 | 555 | 6789 |
| 324 — PRIMARY OFFICE | N40.5626 | W74.5414 | 01 | 52 | 908 | 555 | 3412 |
| 424 — REMOTE OFFICE #1 | N50.2701 | E11.15121 | 011 | 49 | 069 | 5555 | 123 |
| 524 — REMOTE OF... | | | | | 069 | 5555 | 11 |

FIG. 16

| LOCATION | PIN ENABLED | FORWARD WHEN OFF | ALWAYS RING |
|---|---|---|---|
| 124 — PRIMARY RESIDENCE | 0 | 1 | 1 |
| 224 — SECONDARY RESIDENCE | 0 | 0 | 0 |
| 324 — PRIMARY OFFICE | 1 | 1 | 1 |
| 424 — REMOTE OFFICE #1 | 1 | 1 | 1 |
| 524 — REMOTE OFFICE #2 | 1 | 1 | 1 |

METHOD FOR CALL FORWARDING A CALL FROM A MOBILE TELEPHONE

CROSS-REFERENCE TO RELATED APPLICATIONS

This application is a continuation of application Ser. No. 10/922,444, filed Aug. 19, 2004, and entitled "Method for Call Forwarding a Call from a Mobile Telephone," now U.S. Pat. No. 7,194,268 issued Mar. 20, 2007, which is a continuation of application Ser. No. 10/027,003, filed Dec. 20, 2001, and entitled "Method for Call Forwarding a Call from a Mobile Telephone," now U.S. Pat. No. 6,856,806 issued Feb. 15, 2005.

BACKGROUND OF THE INVENTION

The present invention relates to a method of call forwarding a call originally destined for a mobile telephone to a landline telephone and, more particularly, to a method of call forwarding a call when the mobile telephone is at a known location.

Mobile telephones (e.g., cellular telephones) are radiotelephones using radio frequency (RF) signals. Such telephones are handheld portable devices or portable devices that are semi-permanently mounted in an automobile. Such telephones use a network of short-range transmitters and receivers located in overlapping cells throughout a region, with a mobile telephone switching office making connections to regular telephone lines or landlines. Mobile telephones are well known in the art.

Call forwarding is an option for landline telephones and mobile telephones. The call forwarding option enables a user to have a telephone call originally directed to a particular telephone number associated with a telephone redirected to another telephone number. Most call forwarding options for landline telephones require the user to dial a code or actuate a button on the telephone to which the call was originally directed, when the user wants to enable call forwarding. Most call forwarding options for mobile telephones require the user to enable the feature by dialing a feature enable number that will forward calls when the mobile telephone is either powered off or is "out of service" (i.e., not in close enough proximity to a base transmitter/receiver to be detected or to establish a bi-directional connection). One method and system for call forwarding is disclosed in U.S. Pat. No. 6,134,314.

Mobile location technologies exist for determining the geographic location of a particular mobile telephone. Currently, there are two primary ways of determining the location of a mobile telephone: by detecting the direction of the RF signal relative to one or more base transmitter/receivers or by global position satellite (GPS) transmitter/receivers that are separate and distinct RF signals in addition to the telephone RF signals. Mobile location technologies are being used by emergency response dispatchers, such as 911 dispatchers, to locate users who place emergency calls, but who cannot provide their location. Mobile location technologies are also being used by automobile service providers as a tool to locate users by means of the users' mobile telephones for the purposes of providing navigation assistance, emergency assistance, for identifying stores, restaurants, hotels and the like in relative proximity to the user, and for other similar reasons. Mobile location technologies may have other uses or applications such as determining vehicle traffic flow, determining base transmitter/receiver loading, asset tracking, employee tracking and the like. However, mobile location technologies themselves are not the invention identified herein and are only relevant as they pertain to a call forwarding method. Several mobile locations technologies are disclosed in U.S. Pat. Nos. 6,064,339, 6,084,546, 6,104,3344, 6,108,557, 6,101,390, 6,112,095, and 6,232,918 B1.

Another prior art device is disclosed in U.S. Pat. No. 6,154,650 of Abidi et al. ("Abidi"). Abidi discloses a system and method for delivering a call for a mobile station using either wireless or a wireline (or landline) network. The disclosed system of Abidi includes a mobile station (or mobile telephone) and a cordless base station that is connected to a landline telephone network. When the mobile telephone is out of radio range of the cordless base station, the mobile telephone functions as a "normal" mobile telephone utilizing mobile base transmitter/receivers. However, when the mobile telephone is within detectable radio range of the cordless base, the mobile telephone switches to a cordless telephone mode and the cordless base automatically signals a service that will then forward all incoming mobile telephone calls to the cordless base via the landline telephone network in order to improve connections. The system of Abidi requires additional hardware for the cordless base and the mobile telephone and a dedicated landline telephone line for the cordless base.

What is not provided for in the prior art is a method of call forwarding that is used in conjunction with a mobile location technology so that a call originally placed to a mobile telephone number of a mobile telephone can be forwarded to a landline telephone number of a landline telephone when the mobile telephone is at a known location associated with the landline telephone as determined by a mobile location technology. Further, the prior art does not provide for a call forwarding method that only has to be setup or initialized once and then automatically determines when call forwarding should occur. Even further, the prior art does not provide for such a system that could function with existing mobile telephone hardware and that does not require additional mobile telephone hardware to implement.

BRIEF SUMMARY OF THE INVENTION

Briefly stated, the present invention comprises a method of call forwarding a call originally placed to a mobile telephone number of a mobile telephone to a landline telephone number of a landline telephone, wherein the call is routed through a telephone network by a service provider. A forwarding location of the mobile telephone is determined using a mobile location technology. The mobile location technology is capable of locating the mobile telephone using service provider equipment. The landline telephone number of the landline telephone is provided to the service provider. A current mobile telephone location of the mobile telephone is determined by the mobile location technology. The service provider determines that the call is being made to the mobile telephone when the current mobile telephone location is approximately at the forwarding location, and the forwarding location determines when a user is functionally able to answer the landline telephone. The call to the mobile telephone number is forwarded to the landline telephone number using the service provider equipment when the current mobile telephone location is approximately at the forwarding location.

The present invention also provides for a method of call forwarding a call originally placed to a mobile telephone number of a mobile telephone to a landline telephone number of a landline telephone, wherein the call is routed through a telephone network by a service provider. A forwarding location of the mobile telephone is determined using a mobile location technology. The mobile location technology is capable of locating the mobile telephone using service provider equipment. The landline telephone number of the landline telephone is provided to the service provider. A current mobile telephone location of the mobile telephone is determined by the mobile location technology. The service provider determines that the call is being made to the mobile telephone when the current mobile telephone location is approximately at the forwarding location, and the forwarding location determines when a user is functionally able to answer the landline telephone. The call is placed to the mobile telephone number and simultaneously another call is placed to the landline telephone number using the service provider equipment when the current mobile telephone location is approximately the forwarding location. The call is connected to one of either the mobile telephone number or the landline telephone number when the mobile telephone number is answered or the landline telephone number is answered, respectively, and the call is terminated to either the mobile telephone number or the landline telephone number that is unanswered.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 15 is a portion of a table for a database in accordance with an embodiment of the present invention; and FIG. 16 is another portion of the table of FIG. 15.

DETAILED DESCRIPTION OF THE INVENTION

Figure 1:
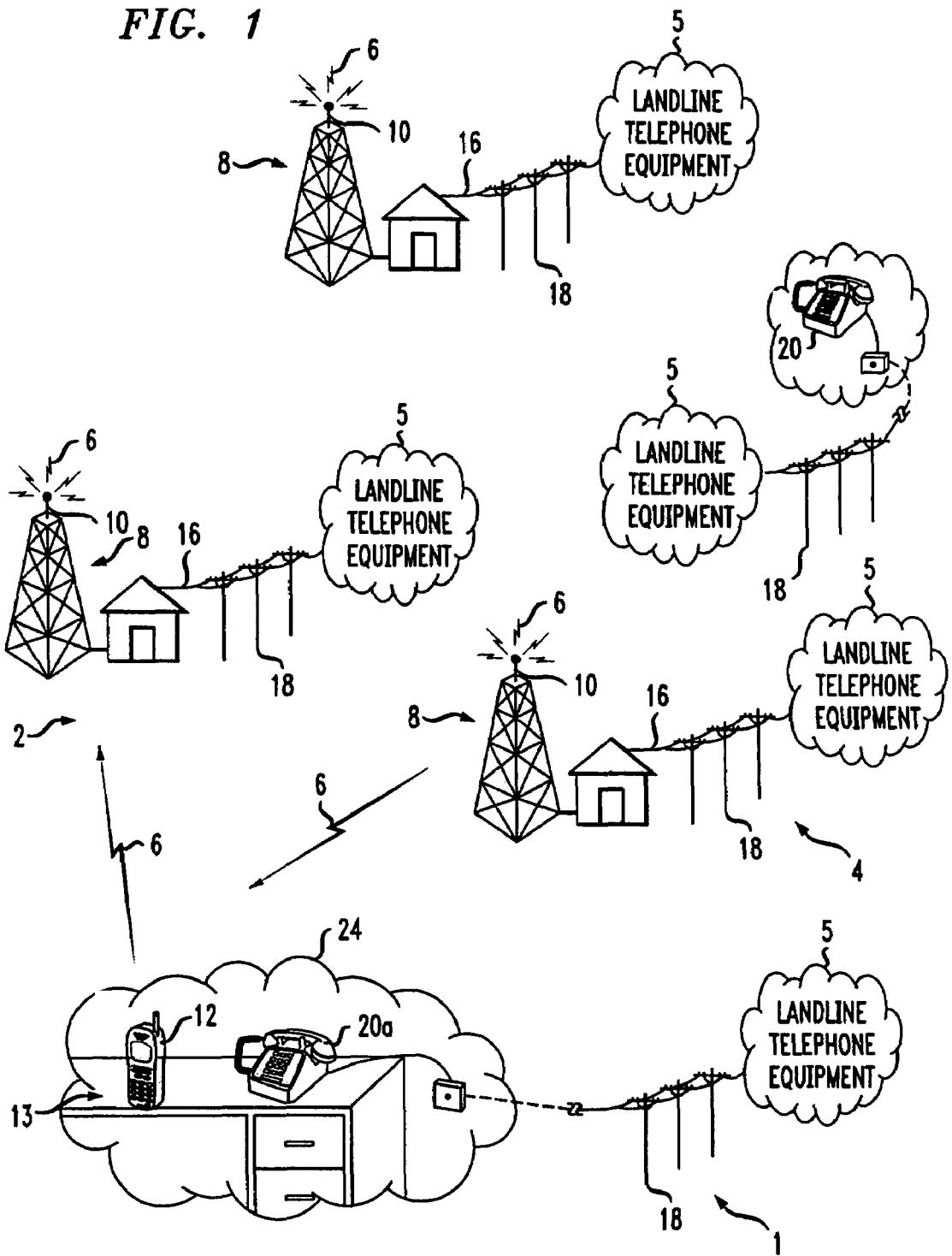
FIG. 1 is a functional diagram of a wireless and landline telephone system in accordance with the present invention.

Referring to the drawings in detail, wherein like numerals indicate like elements throughout the several figures, there is shown in FIG. 1 a functional diagram of a wireless telephone system 2 and landline telephone system 4 in accordance with the present invention. A telephone network 1 includes both the wireless telephone system 2 and the landline telephone system 4.

The wireless telephone system 2 includes base transmitter/receiver (TX/RX) stations 8, sometimes referred to as mobile or cellular towers. The base TX/RX stations 8 have at least one antenna 10 for transmitting and receiving mobile telephone radio frequency (RF) signals 6 to and from mobile telephones 12. The base TX/RX stations 8 are typically located so that they have overlapping detection areas or cells. Further, the base TX/RX stations 8 have a connection or switch for connecting mobile telephone calls to the landline telephone system 4, or multiple base TX/RX stations 8 may share a common central switch for connecting mobile telephone calls to the landline telephone system 4. The antennas 10 may be located on a dedicated antenna tower as depicted in FIG. 1, but can also be located on a shared tower, a water storage tank, a tall building or the like, in order to provide the antenna 10 with the widest possible coverage area with the best reception of mobile telephone RF signals 6.

The landline telephone system 4 includes hardwired telephone cables 16 that may be strung between telephone poles 18 or that may be buried underground, directly or inside conduits (not shown). The telephone cables 16 may be twisted copper or aluminum pairs or multi-pair bundles, twisted and shielded copper or aluminum pairs or multi-pair bundles, multi-conductor bundles, fiber optic strands, fiber optic bundles or the like. The landline telephone system 4 also has landline telephone equipment 5 including telephone relays, switches (electrical, electronic, and/or electromechanical), digital to analog (D/A) converters, analog to digital (A/D) converters, fiber optic converters, multiplexers, microprocessors, and the like (all not shown) which connect calls to/from landline telephones 20 to/from other landline telephones 20 and which connect calls to/from mobile telephone networks 2 from/to landline telephones 20. The landline telephone system 4 is well known in the art. Therefore it is not necessary to further describe the operation of the landline telephone system 4 herein, other than indicate how it applies to the present invention.

A preferred embodiment of the present invention provides for a method of call forwarding a call that is originally placed to a mobile telephone number of a mobile telephone 12 to a landline telephone number of a specific landline telephone 20a, wherein the call is routed through a telephone network 1 by a service provider (not shown).

Using the method of the present embodiment, a forwarding location 24 of the mobile telephone 12 is determined using a mobile location technology. The mobile location technology is capable of locating the mobile telephone 12 using service provider equipment (not shown). The landline telephone number of the specific landline telephone 20a is provided to the service provider. A current mobile telephone location 13 of the mobile telephone 12 is determined by the mobile location technology. The service provider determines that the call is being made to the mobile telephone 12 when the current mobile telephone location 13 is approximately at the forwarding location 24, and the forwarding location 24 determines when a user (not shown) is functionally able to answer the specific landline telephone 20a. The call to the mobile telephone number is forwarded to the landline telephone number using the service provider equipment when the current mobile telephone location 13 is approximately at the forwarding location 24.

Figure 2:
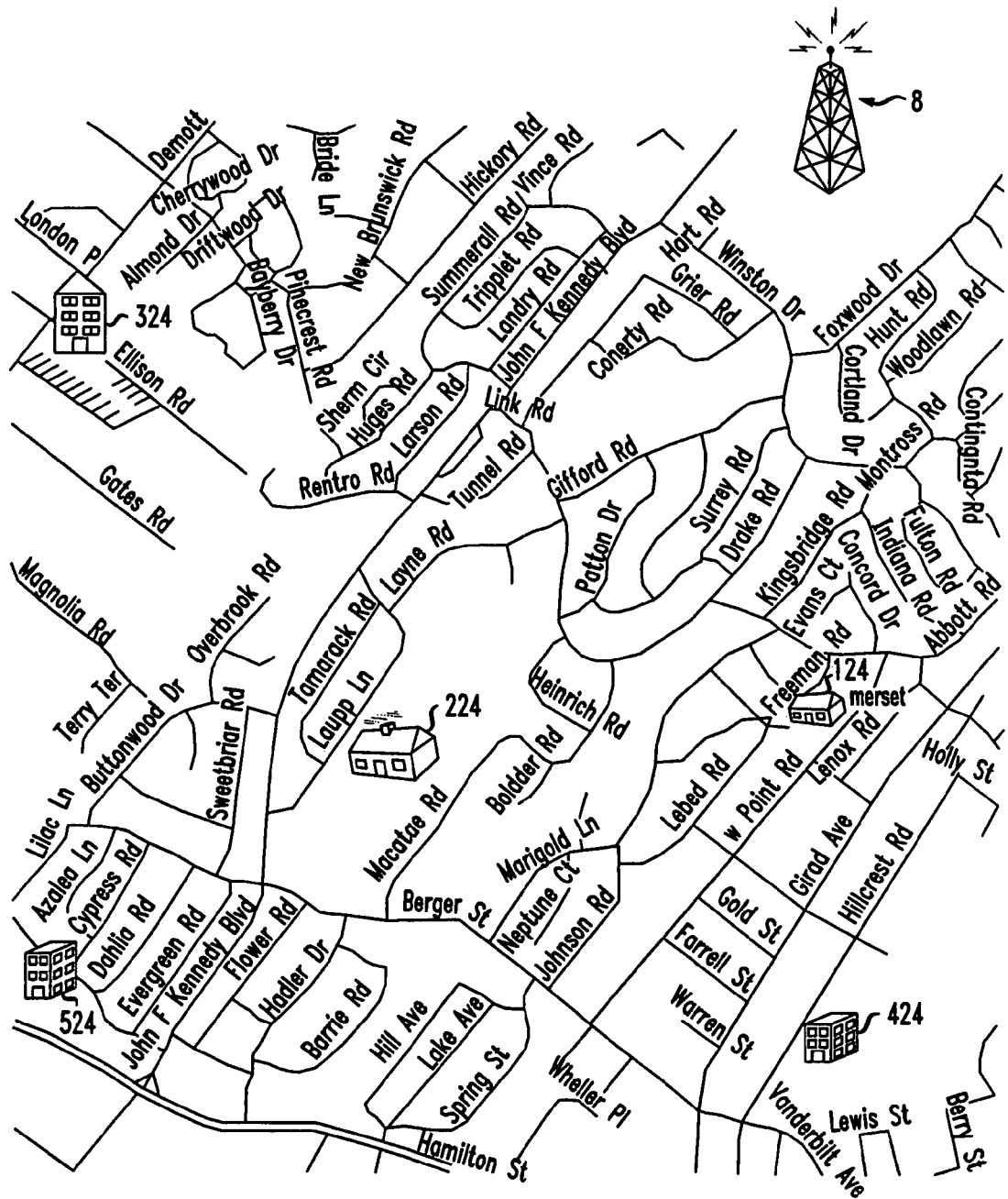
FIG. 2 is a diagram of several known locations in accordance with another embodiment of the present invention.

The method of call forwarding is preferably provided as an optional feature for the mobile telephone 12 by the service provider. The method of call forwarding can also be a standard feature of the mobile telephone 12. The user may be required to setup or initialize the feature by calling a specially provided telephone number, such as an "800" or "877" number or the like, from the mobile telephone 12 while the user is at the forwarding location 24. Alternatively, the user may call a specially provided number from the landline telephone number of the specific landline telephone 20a while the mobile telephone 12 is at the forwarding location 24 and is powered on. The user may simply provide the service provider with the street address of the forwarding location 24 and with the landline telephone number associated with that forwarding location 24, foregoing the call to initialize the feature. But presently, it is more accurate to use the mobile location technology to determine the forwarding location 24, thereby compensating or correcting for any deviations in the geographic coordinates in databases of street addresses used for many different types of location technologies. Examples of forwarding locations 24 include a primary residence 124 (FIG. 2), a secondary residence 224, a primary office 324, a first remote office 424, a second remote office 524, or any other location where a user's mobile telephone 12 can be located anywhere around the World. The user may configure the forwarding location 24 to be a list of a plurality of forwarding locations 24 such that each of the forwarding locations 24 has an associated landline telephone 20 having a unique landline telephone number.

FIG. 15 shows a partial table 600 of a database 601 demonstrating the association of the forwarding locations 24, such as using street addresses or relative coordinates with landline telephone numbers. Each forwarding location 124, 224, 324, 424, 524 of the plurality of forwarding locations 24 may also have a set of geographic coordinates 602 such as latitude 604 and longitude 606 values. Other ways of determining or expressing the forwarding location 24, such as using street address or relative coordinates, may be used without departing from the broad scope of the invention.

An initialization process 99 is shown in FIGS. 7-12. The initialization process 99 is implemented by way of an automated attendant that "speaks" prerecorded or voice synthesized phrases, questions and menu selections as is well known in the art. The implementation of the initialization process 99 can be done in other ways without departing from the broad scope of the present invention, such as using a live attendant, a menu screen, dedicated mobile telephone buttons (hardware and/or software buttons) and the like. In step 100, the user calls a dedicated number provided by the service provider from the mobile telephone 12 from one of the forwarding locations 24. The service provider uses the mobile location technology in order to determine, at step 101, the current mobile telephone location 13 of the mobile telephone 12. The service provider queries the user, at step 102, in order to determine which location name to associate with the current mobile telephone location 13 that is being configured by the user. While there are six pre-configured location names demonstrated herein, there could be other pre-configured locations or the system could allow the user to customize the selections by typing or saying different names without departing from the present invention. If the user confirms that the current mobile telephone location 13 is the user's primary residence 124 by answering "Yes" or by saying or entering "1", the service provider associates, at step 103, the geographic coordinates 602 determined by the mobile location technology with the primary residence 124 in the database. The user is then prompted, at step 104, to enter the landline telephone number of the specific landline telephone 20a associated with the primary residence 124. The service provider associates the landline telephone number entered by the user with the primary residence 124 in the database.

Figure 8:
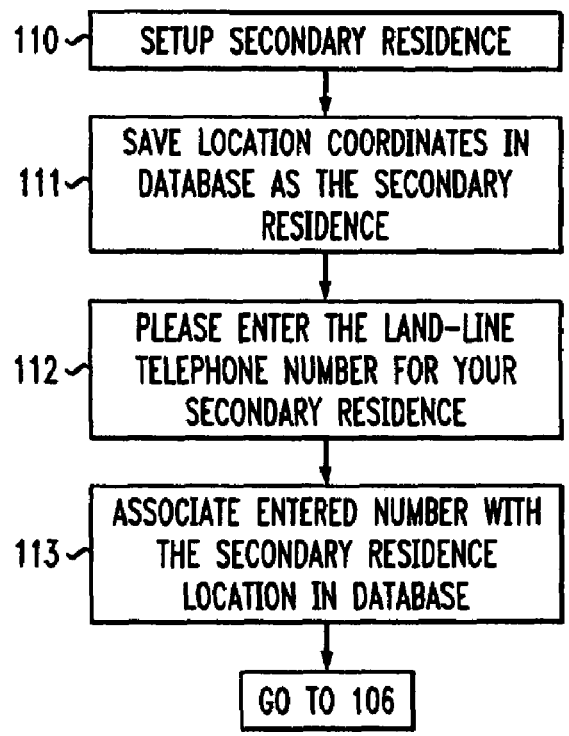
FIG. 8 is a flow diagram illustrating a continuation of the initialization process of FIG. 7.
Figure 9:
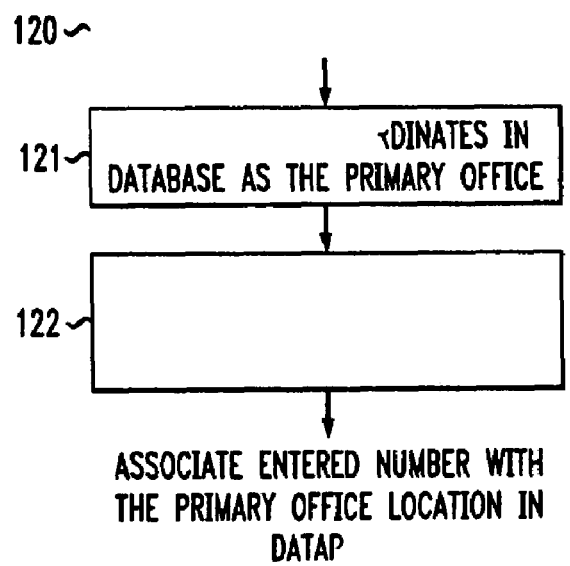
FIG. 9 is a flow diagram illustrating a continuation of the initialization process of FIG. 7.
Figure 10:
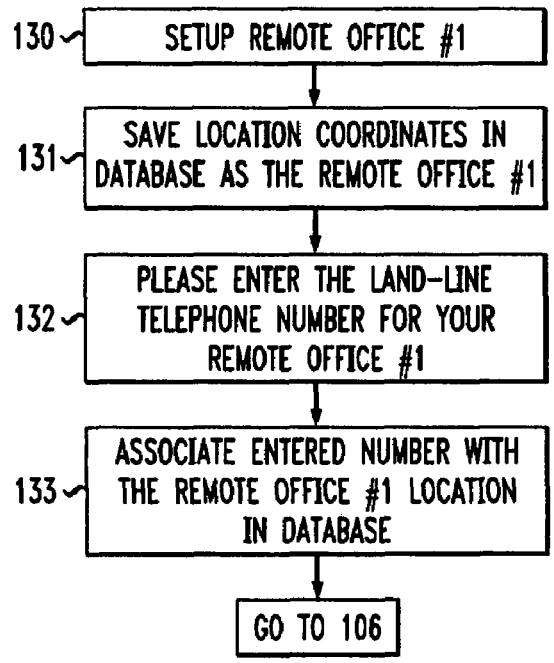
FIG. 10 is a flow diagram illustrating a continuation of the initialization process of FIG. 7.
Figure 11:
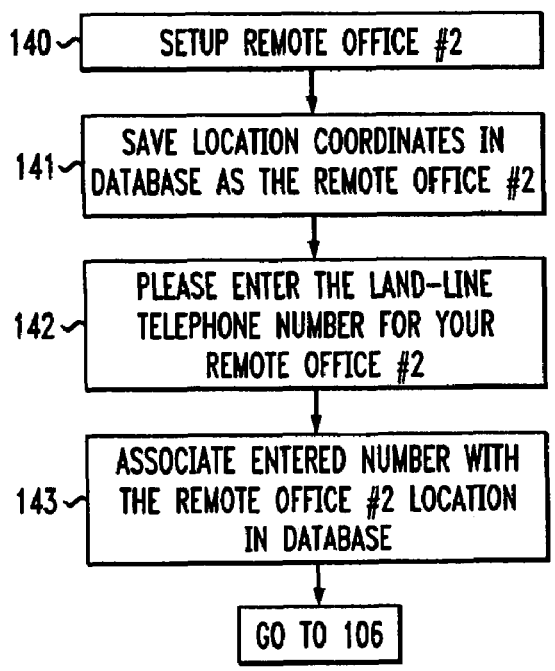
FIG. 11 is a flow diagram illustrating a continuation of the initialization process of FIG. 7.
Figure 12:
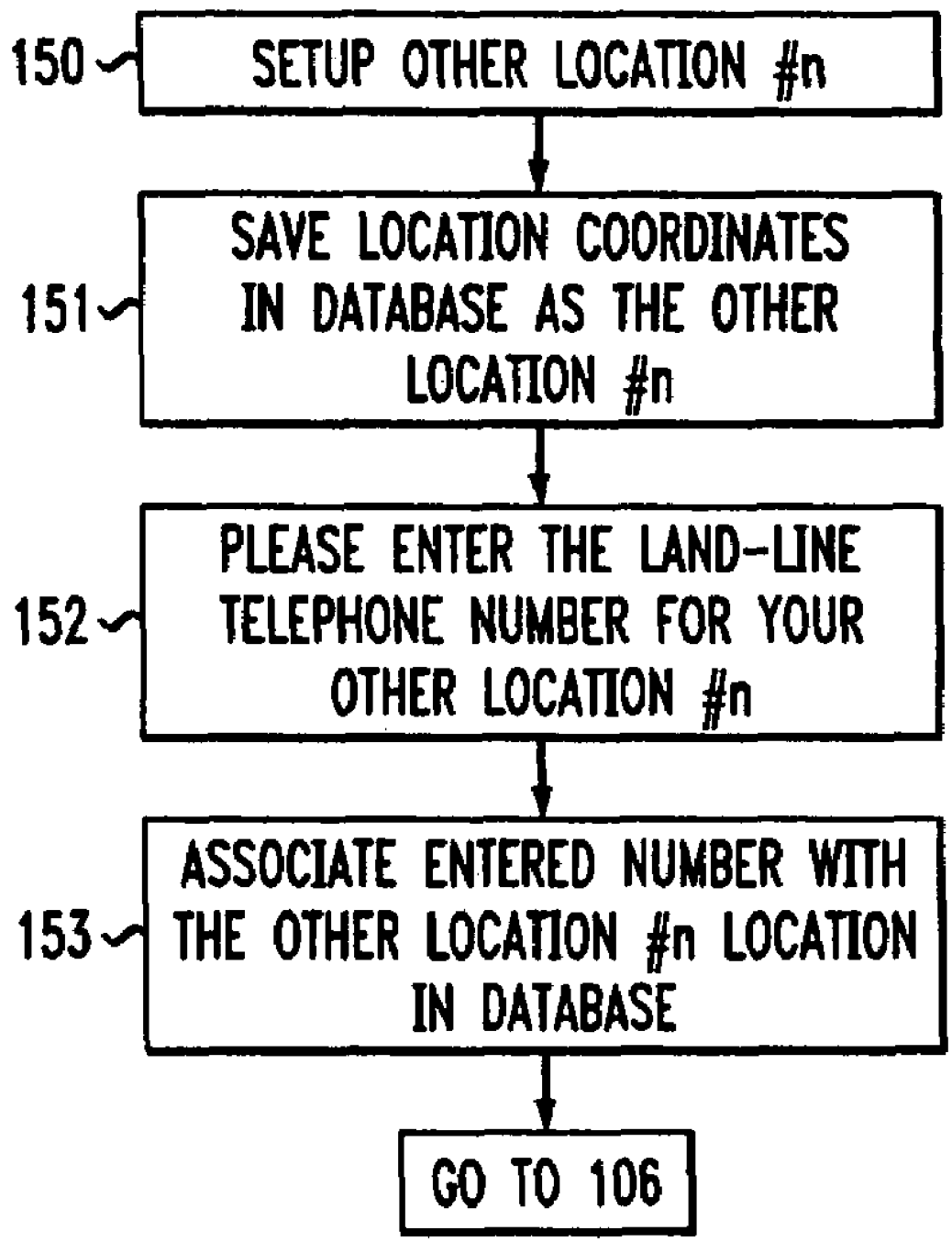
FIG. 12 is a flow diagram illustrating a continuation of the initialization process of FIG. 7.

If the user was not at the user's primary residence 124, but rather was at the user's secondary residence 224, the user would answer "NO" or say or enter "2" at step 102 in the initialization process 99. The user is prompted, at step 108, to identify which of the forwarding locations 24 is the current mobile telephone location 13 at the time of initialization of that forwarding location 24. The user is prompted to say or enter a menu number associated with the forwarding location 24, in the present case "2" being associated with the secondary residence 224. After the user answers or enters "2", the service provider's system saves, at step 111, the geographic coordinates 602 determined by the mobile location technology with the secondary residence 224 in the database 601 as shown in FIG. 8. The user is then prompted, at step 112, to enter the landline telephone number of the specific landline telephone 20a associated with the secondary residence 224. The service provider associates, at step 113, the landline telephone number entered by the user with the secondary residence 224 in the database 601. The service provider's system initializes or configures the primary office 324, the first remote office 424, the second remote office 524 and other locations in a similar fashion. [As demonstrated in FIGS. 9, 10, 11, and 12, respectively.]

Figure 13:
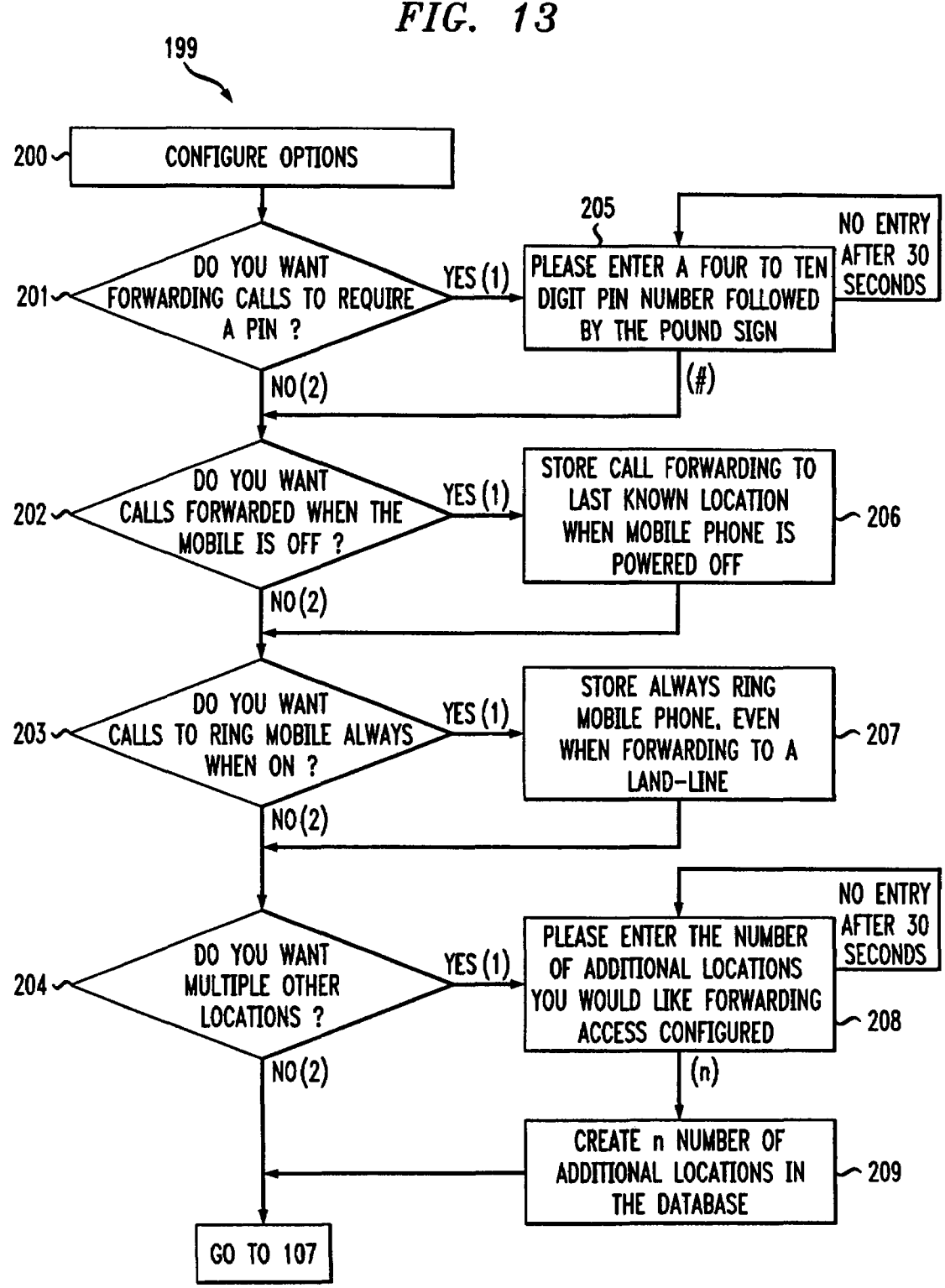
FIG. 13 is a flow diagram illustrating a continuation of the initialization process of FIG. 7.

In one embodiment shown in FIG. 13, the user can configure user-configurable options or optional features 199 at steps 200-209 for the mobile telephone 12. One option, when enabled at step 201, requires a user to enter a personal identification number (PIN) when the landline telephone is answered and before the call can be completed to the specific landline telephone 20a. The PIN number can be any number or combination of numbers and characters and may be of any length but, preferably, the PIN number is between four and ten digits in length so that the user can easily remember the PIN number without having to write it down, thereby compromising the security of the PIN number. The use of PIN numbers in general is well known. The use of a PIN number as it pertains to the present invention is to prevent the user's calls from being answered by someone other than the user when the calls are forwarded to the landline telephone number which may be accessible by individuals other than the user.

When the call is unanswered after a predetermined period of time or a predetermined number of rings, the call can be forwarded to a voicemail box (not shown) associated with the mobile telephone number. The number of rings or period of time can be user-configurable options 199, but are not necessarily so. Each of the forwarding locations 24 may have a different selected configuration for such a voicemail option. FIG. 16 shows a configuration portion 625 of the database 601 demonstrating that the service provider's system maintains a record of the selected configurations for the forwarding locations 24 in the database 601. In the present embodiment, a zero ("0") indicates that a feature is not enabled and a one ("1") indicates that a feature is enabled. Other options may be configured as well, such as configuring multiple other locations 624 at steps 204, 208 and 209 (FIG. 13). The user is prompted to enter a number n of additional locations that can also be configured as forwarding locations. Examples of even more options are described hereafter.

In an alternate embodiment, the call to the mobile telephone number is directed to the mobile telephone number of the mobile telephone 12 and is simultaneously forwarded from the mobile telephone number to the landline telephone number of the specific landline telephone 20*a* using the service provider equipment when the current mobile telephone location 13 is approximately the forwarding location 24. When the mobile telephone 12 is answered or the specific landline telephone 20*a* is answered, the call is connected to either the mobile telephone number or the landline telephone number, respectively, and the call is terminated or discontinued to either the mobile telephone number or the landline telephone number that is unanswered. Steps 203 and 207 of FIG. 13 show that the present alternate embodiment may also be one of the configurable options 199 configured by the user to be enabled or disabled at any time or at any of the forwarding locations 24.

In another alternate embodiment, the service provider equipment captures the current mobile telephone location 13 when the mobile telephone 12 is powered off and stores the current mobile telephone location 13 at the time the mobile telephone is powered off in a last known location in the database 601. When a call is being made to the mobile telephone 12 and the mobile telephone 12 is powered off, the service provider can determine whether or not the last known location is approximately the forwarding location 24. If the last known location is approximately the forwarding location 24, the service provider forwards the call from the mobile telephone number to the landline telephone number using the service provider equipment. Alternatively, if the last known location is a different location compared to the forwarding location 24 (i.e., the last known location is not the forwarding location), the service provider forwards the call from the mobile telephone number to the voicemail box using the service provider equipment. The voicemail box may be directly associated with the mobile telephone number of the mobile telephone 12 or may be any other voicemail box. Steps 202 and 206 of FIG. 13 show that the present alternate embodiment may also be one of the configurable options 199 configured by the user to be enabled or disabled at any time or at any of the forwarding locations 24.

Figure 3:
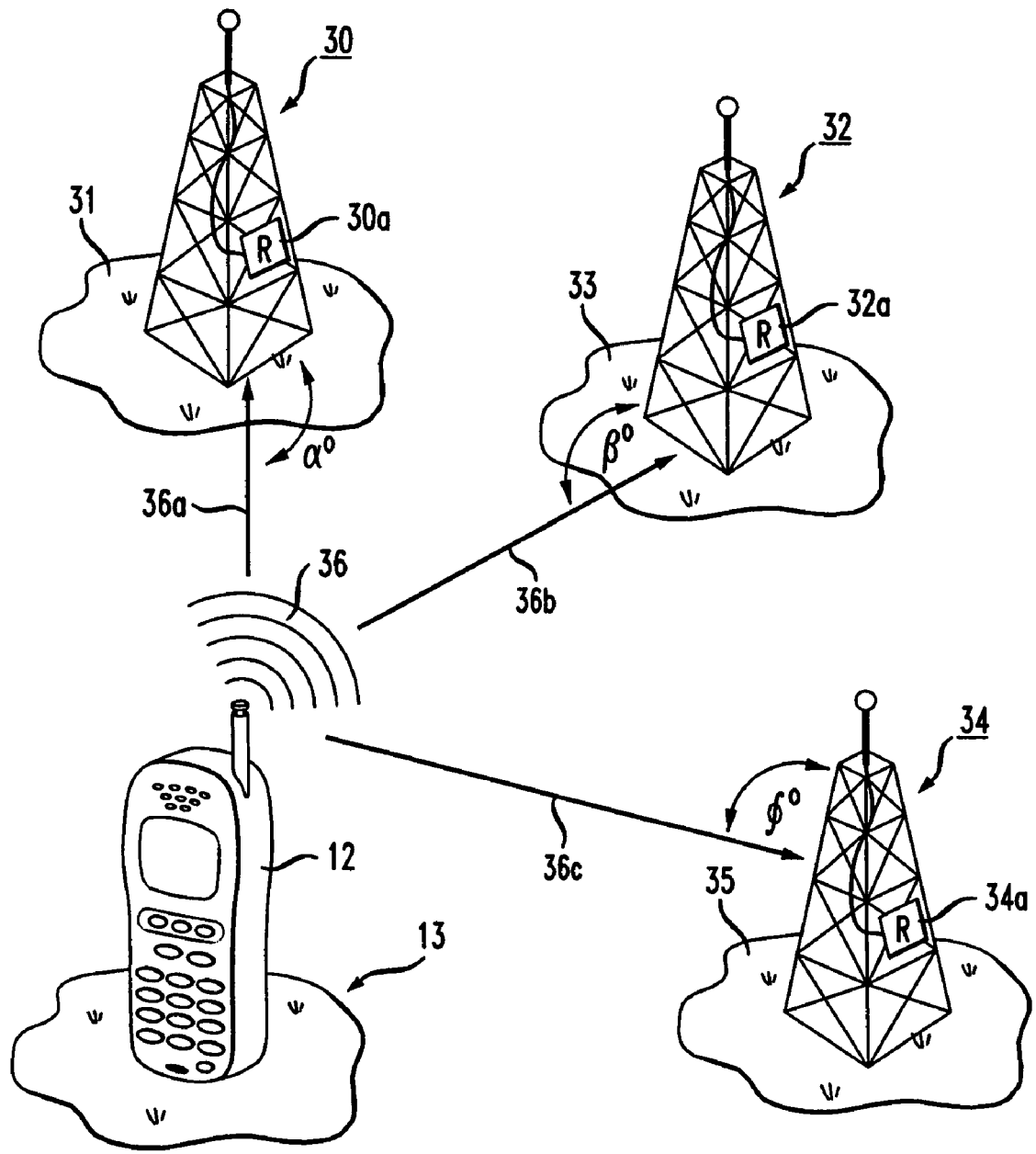
FIG. 3 is a functional diagram illustrating a mobile location technology in accordance with a first preferred embodiment of the present invention.

In a first preferred embodiment shown in FIG. 3, the mobile location technology is an angle of arrival (AOA) method. A signal 36 of the mobile telephone 12 has a first signal component 36*a*, a second signal component 36*b*, and a third signal component 36*c*. The first signal component 36*a* is received at a first antenna site 30 having a first receiver 30*a* and a first geographic location 31. The second signal component 36*b* is received at a second antenna site 32 having a second receiver 32*a* and a second geographic location 33. Each of the receivers 30*a*, 32*a* is capable of detecting compass direction. There may be additional antenna sites such as a third antenna site 34 having a third receiver 34*a* and a third geographic location 35, but only two antenna sites 30, 32 are required by the AOA method. A first AOA $\alpha$ in degrees is determined when the signal 36 reaches the first receiver 30*a* and a second AOA $\beta$ in degrees is determined when the signal 36 reaches the second receiver. An angular difference (not shown) is calculated between the first AOA $\alpha$ and the second AOA $\beta$. The current mobile telephone location 13 is generated by using a geographic location algorithm (not shown) and is expressed in longitude 606 and latitude 604. The geographic location algorithm is a function of the angular difference and the geographic locations 31, 33 of the first and second antenna sites 30, 32, respectively.

Figure 4:
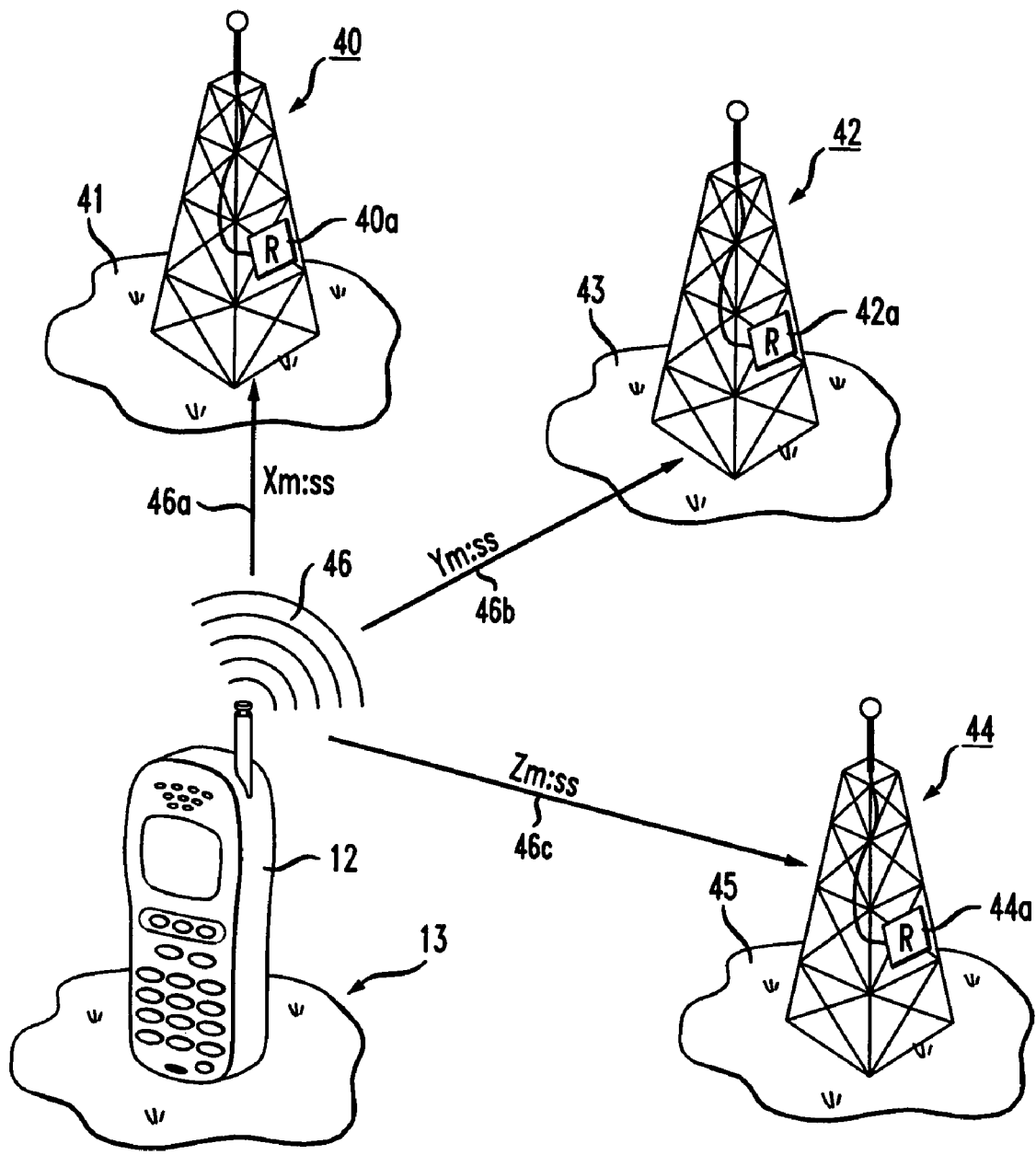
FIG. 4 is a functional diagram illustrating a mobile location technology in accordance with a second preferred embodiment of the present invention.

In a second preferred embodiment shown in FIG. 4, the mobile location technology is a time difference of arrival (TDOA) method. A signal 46 of the mobile telephone 12 has a first signal component 46*a*, a second signal component 46*b*, and a third signal component 46*c*. The first signal component 46*a* is received at a first antenna site 40 having a first receiver 40*a* and a first geographic location 41. The second signal component 46*b* is received at a second antenna site 42 having a second receiver 42*a* and a second geographic location 43. The third signal component 46*c* is received at a third antenna site 44 having a third receiver 44*a* and a third geographic location 45. The first, second and third receivers 40*a*, 42*a*, 44*a* are synchronized by using a precision standard clock (not shown). It is not necessary for the precision standard clock to be an atomic clock because the time base is relative to the three receivers, so inaccuracies in the time will be canceled in any differential calculations so long as the time bases of the three receivers are synchronized. A first TOA x is determined when the first signal component 46*a* reaches the first receiver 40*a*. A second TOA y is determined when the second signal component 46*b* reaches the second receiver 42*a*. A third TOA z is determined when the third signal component 46*c* reaches the third receiver 44*a*. A first time difference (not shown) is calculated as the difference between the first TOA x and the second TOA y. A second time difference (not shown) is calculated as the difference between the second TOA y and the third TOA z. A third time difference (not shown) is calculated as the difference between the third TOA z and the first TOA x. The current mobile telephone location 13 is generated by using a geographic location algorithm (not shown) and is expressed in longitude 606 and latitude 604. The geographic location algorithm is a function of a known transmission speed of the signal 46 of the mobile telephone 12, the first, second and third time differences and the respective geographic locations 41, 43, 45 of the first, second and third antenna sites 40, 42, 44.

Figure 5:
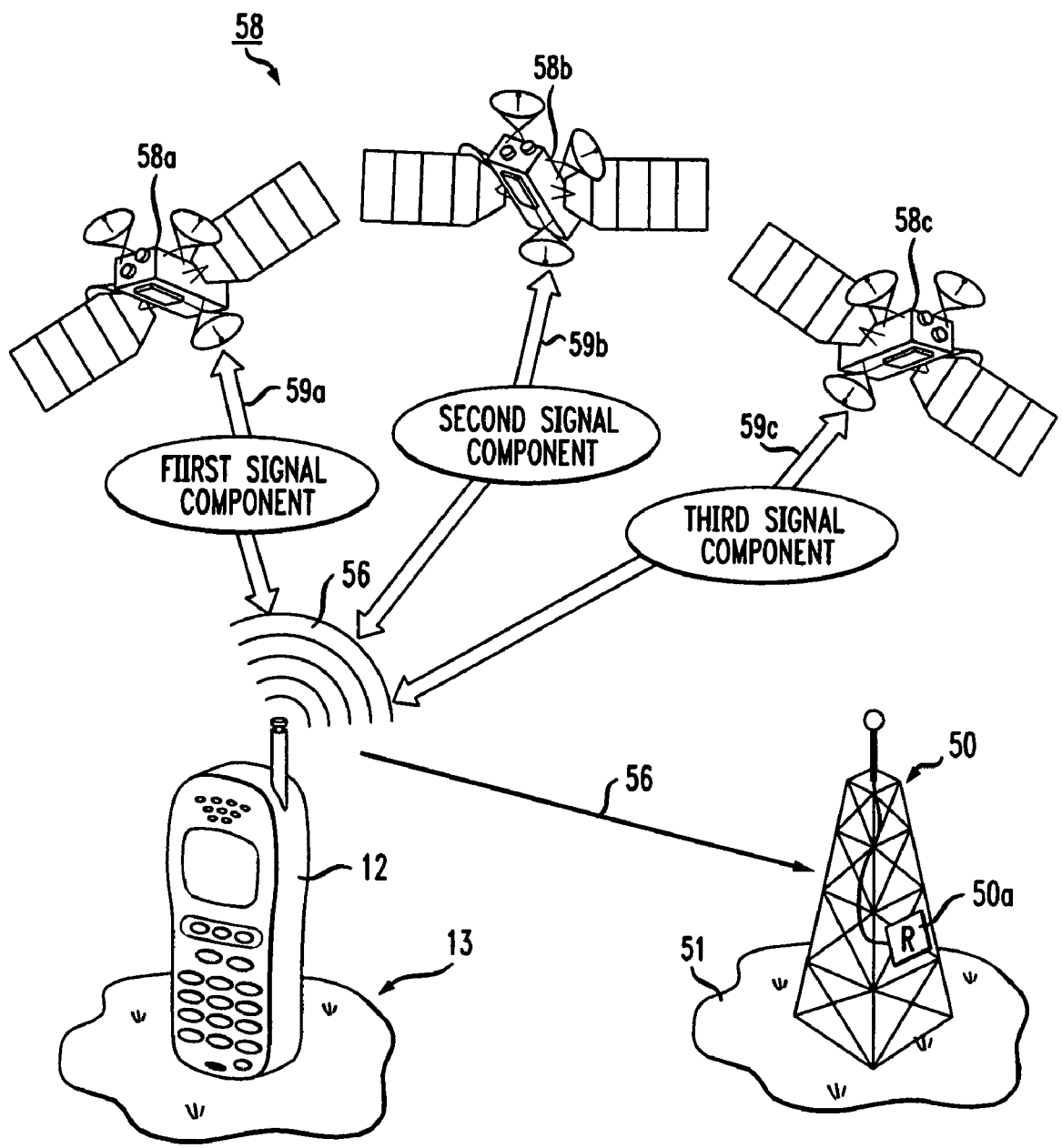
FIG. 5 is a functional diagram illustrating a mobile location technology in accordance with a third preferred embodiment of the present invention.

In a third preferred embodiment shown in FIG. 5, the mobile location technology is a global positioning system (GPS) method. A GPS satellite network 58 is provided which is capable of determining a geographic location expressed in longitude 606 and latitude 604. The GPS satellite network includes at least a first satellite 58*a*, a second satellite 58*b* and a third satellite 58*c*, but preferably there are twenty-four or more satellites in the GPS satellite network 58. The GPS satellite network 58 of the presently preferred embodiment is the NAVSTAR system operated by the United States Government, but the GPS satellite network 58 may be another similar satellite navigation/position location system. The mobile telephone 12 of the present embodiment has a GPS transceiver (not shown) that communicates to the GPS satellite network 58 by a GPS RF signal 59 that has at least a first component 59*a*, a second component 59*b* and a third component 59*c*. The GPS satellite network 58 determines the current mobile telephone location 13 by trilateration (or less formally "triangulation") of the first, second and third signal components 59*a*, 59*b*, 59*c*. Trilateration is a measurement of the time delay of each received signal component 59*a*, 59*b*, 59*c* at the three different satellites 58*a*, 58*b*, 58*c* in order to find a unique location in three-dimensional space as determined by plotting three overlapping, imaginary spheres (one per satellite) representative of the possible locations of sources of signals with such a time delay. The satellites 58*a*, 58*b*, 58*c* are time-synchronized on a very precise clock, preferably an atomic clock, but the GPS transceiver of the mobile telephone 12 need not be. The GPS satellite network 58 transmits the current mobile telephone location 13 to the GPS transceiver of the mobile telephone 12. GPS satellite networks 58 and their operation are well known and therefore need not be further detailed herein. A mobile telephone signal 56 of the mobile telephone 12 is received at an antenna site 50 having a mobile signal receiver 50a. The mobile telephone signal 56 includes at least the current mobile telephone location 13, but preferably also includes other information such as a user's communication.

Figure 6:
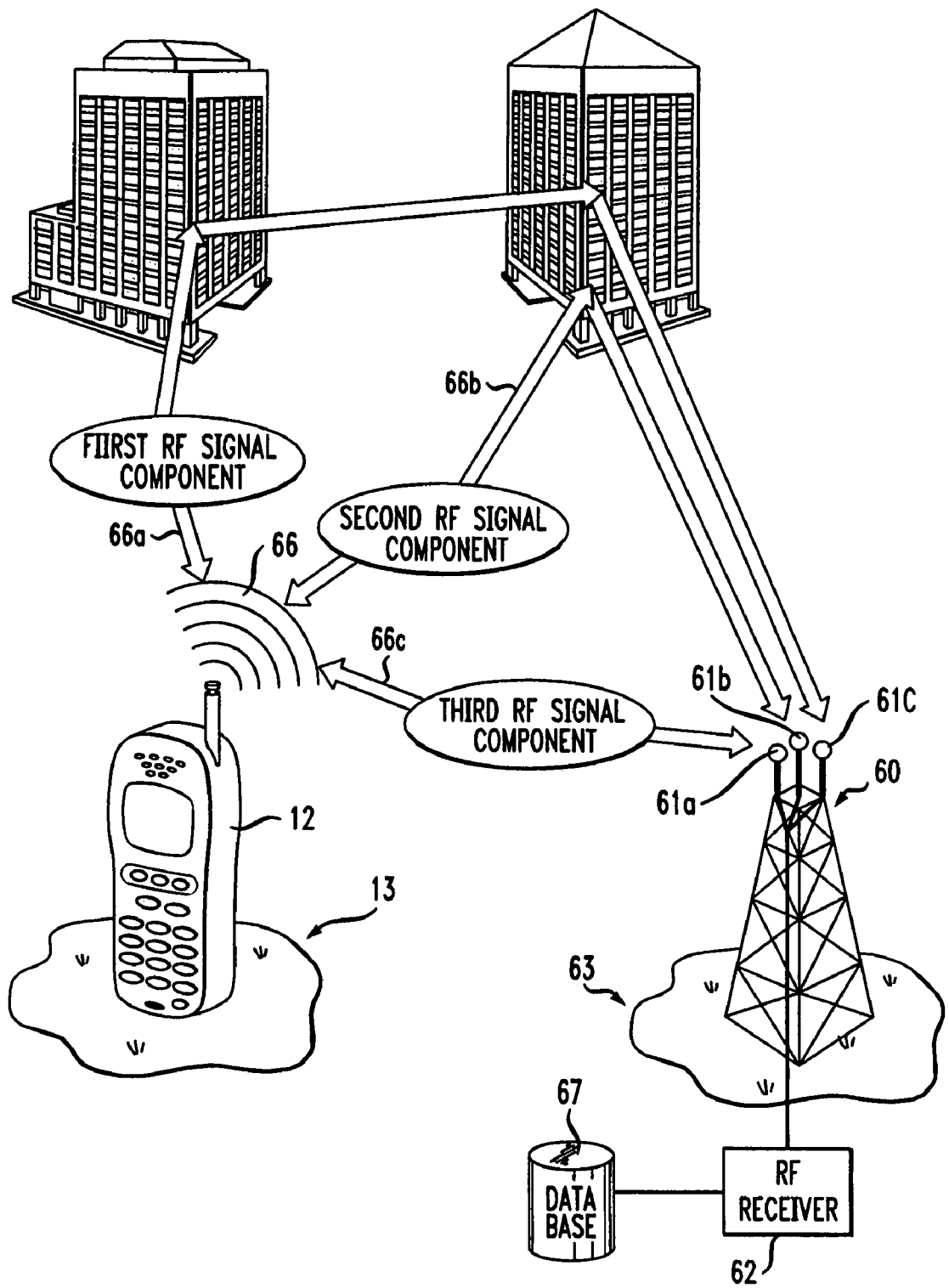
FIG. 6 is a functional diagram illustrating a mobile location technology in accordance with a fourth preferred embodiment of the present invention.
Figure 7:
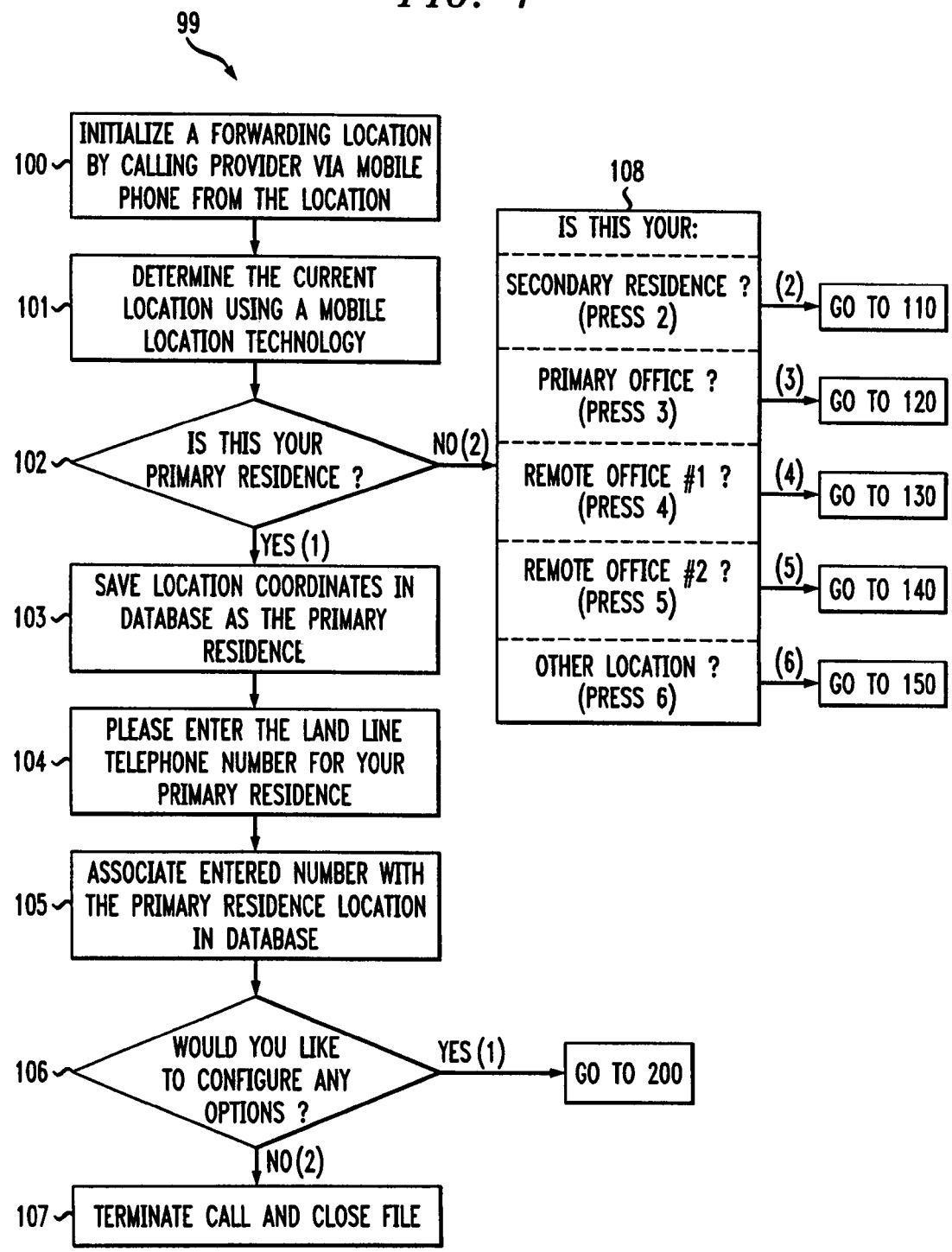
FIG. 7 is a flow diagram illustrating an initialization process in accordance with an embodiment of the present invention.

In a fourth preferred embodiment shown in FIG. 6, the mobile location technology is a location pattern matching method. A characteristic pattern database 67 of standard signal characteristics is created from a plurality of multipath RF signals generated from a known or test mobile telephone (not shown) at a first antenna site 60 having a first antenna 61a, a second antenna 61b, a third antenna 61c and a multipath RF receiver 62. Each of the standard signal characteristics are associated with a known geographic location by compiling the data captured from the known mobile telephone. A multipath RF signal 66 of the mobile telephone 12 has a first multipath RF signal component 66a, a second multipath RF signal component 66b and a third multipath RF signal component 66c. The first multipath RF signal component 66a, the second multipath RF signal component 66b and the third multipath RF signal component 66c take different paths prior to being received at the antenna site 60 and being detected by the first antenna 61a, the second antenna 61b and the third antenna 61c, not necessarily respectively. The detected multipath RF signal components 66a, 66b, 66c are processed by the multipath RF receiver 62 which generates a current signal characteristic (not shown). The current signal characteristic is compared to the characteristic pattern database 67 and a closest match signal characteristic (not shown) from the standard signal characteristics is determined accordingly. The current mobile telephone location 13 expressed in longitude 606 and latitude 604 is generated by using the geographic location associated with the closest match signal characteristic in the characteristic pattern database 67 of standard signal characteristics.

Other embodiments are possible by utilizing iterations and combinations of the aforementioned mobile location technologies and iterations of the combinations of the mobile location technologies thereof. Additionally, the present invention is not limited to the mobile location technologies described herein.

Figure 14:
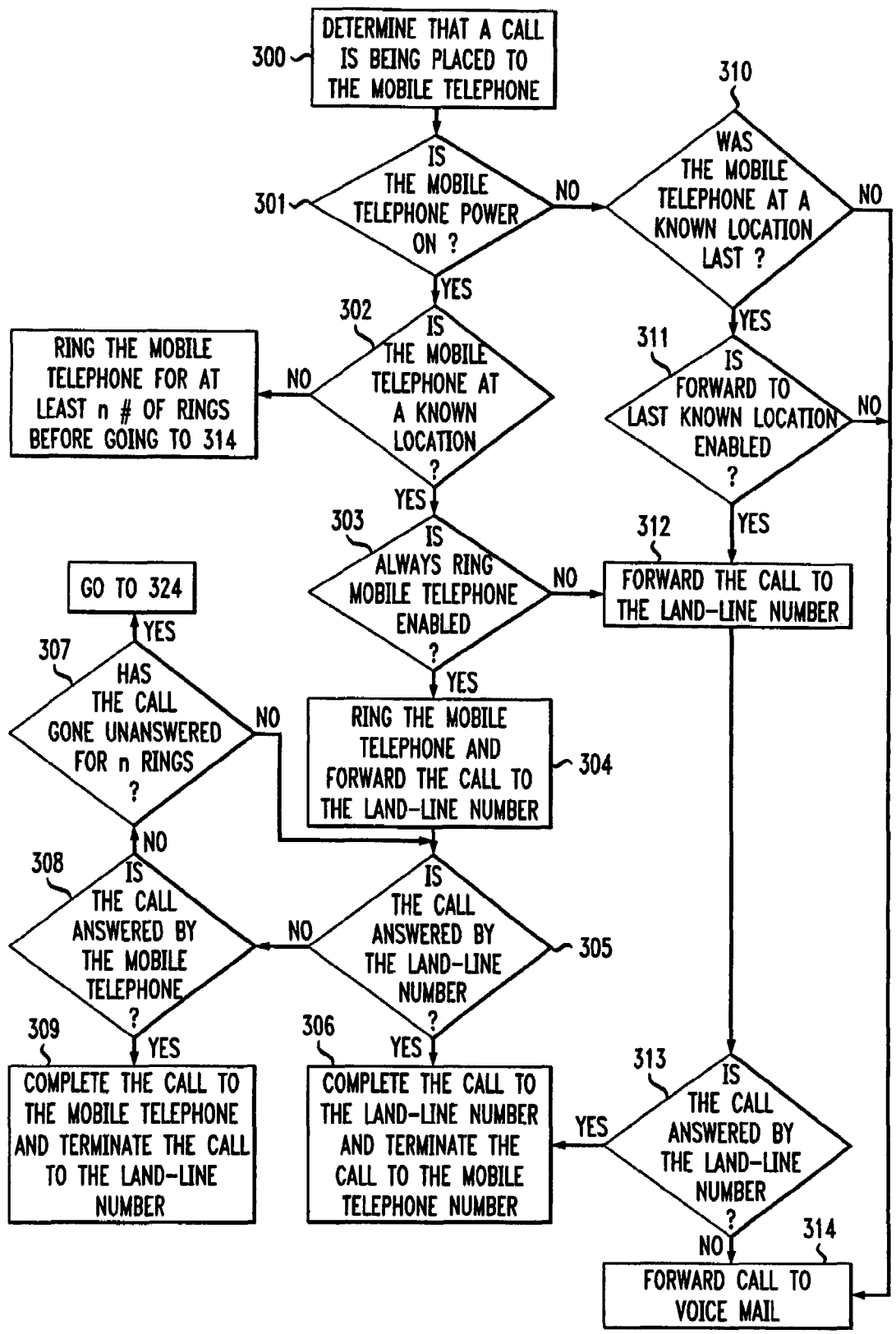
FIG. 14 is a flow diagram illustrating a call forwarding process in accordance with an embodiment of the present invention.

FIG. 14 shows one implementation of the method of forwarding a call to the mobile telephone 12 to the specific landline telephone 20a. At step 300, the service provider's system determines that a call is being placed to the mobile telephone 12. The system checks, at step 301, whether or not the mobile telephone 12 is powered on and is within a detectable service region. If the mobile telephone 12 is not powered on or is not within the detectable service region, the system then determines, at step 310, whether or not the mobile telephone 12 was at a known location last. The known location is one of the forwarding locations 24 configured by the user in the initialization process 99. If the last location was not a known location, the call is forwarded to the voicemail box at step 314. Alternatively, if the last location is the known location, the system checks, at step 311, whether or not a forward to the last known location option is enabled in the configured database 601. When the forward to the last known location option is not enabled, the call is also forwarded to the voicemail box at step 314. When the forward to the last known location option is enabled, the call is forwarded to the landline telephone number associated with the last known location. If the call is answered at the landline telephone, the call is completed; otherwise, the call is forwarded to the voicemail box at step 314 after a predetermined number of rings r.

When the service provider's system determines that the call is being placed to the mobile telephone 12 and the mobile telephone 12 is powered on, the system next determines whether the current mobile telephone location 13 of the mobile telephone 12 is at the known location selected from a configured list of forwarding locations 24. When the current mobile telephone location 13 of the mobile telephone is not at the known location, the call rings the mobile telephone 12 at step 315. If the user answers the call within the predetermined number of rings r, the call is completed to the mobile telephone 12. However, if the call goes unanswered for the predetermined number of rings r, the call is forwarded to voicemail at step 314.

When the service provider's system determines that the call is being placed to the mobile telephone 12 and the mobile telephone 12 is powered on and the current mobile telephone location 13 of the mobile telephone 12 is at the known location selected from the configured list of the forwarding locations 24, the system then determines, at step 303, whether or not an "always ring the mobile telephone" option is enabled. If the "always ring the mobile telephone" option is not enabled, the call is only forwarded to the landline telephone number pursuant to steps 312, 313, 314 and 306. However, when the always ring the mobile telephone option is enabled, the call is forwarded to the landline telephone number and the call is simultaneously routed to the mobile telephone number at step 304. If either the mobile telephone 12 or the landline telephone 20 is answered, the call is completed to that respective telephone at steps 305, 306, 308 and 309. But, if neither the mobile telephone 12 or the landline telephone 20 is answered within the predetermined number of rings r, the call is forwarded to the voicemail box at steps 307 and 314.

From the foregoing, it can be seen that the present invention comprises a method of call forwarding a call to a mobile telephone number of a mobile telephone to a landline telephone number of a landline telephone when the mobile telephone is at a known location as determined by a mobile location technology. It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method of initializing a call forwarding system wherein a call originally placed to a mobile telephone number of a mobile telephone is forwarded to a landline telephone number of a landline telephone associated in a database with a forwarding location, wherein the call is forwarded when the mobile telephone is approximately at the forwarding location, the call being routed through a telephone network by a service provider, the method comprising:

(a) receiving from the landline telephone a set-up telephone call directed to a predetermined number while the mobile telephone is at the forwarding location and is powered on;

(b) upon receiving the set-up telephone call, determining the forwarding location using a mobile location technology to locate the mobile telephone using service provider equipment; and (c) creating a record in the database, the record containing the determined forwarding location associated with the landline telephone number;

wherein the mobile location technology is a time difference of arrival method having the steps of:

(i) receiving a signal of the mobile telephone at a first antenna site having a first receiver, a second antenna site having a second receiver and a third antenna site having a third receiver;

(ii) synchronizing the receivers by using a precision standard clock;

(iii) determining a first time of arrival (TOA) when the signal reaches the first receiver, a second TOA when the signal reaches the second receiver and a third TOA when the signal reaches the third receiver;

(iv) calculating a first time difference between the first TOA and the second TOA, a second time difference between the second TOA and the third TOA, and a third time difference between the third TOA and the first TOA; and (v) generating the current mobile telephone location expressed in longitude and latitude by using a geographic location algorithm, said geographic location algorithm being a function of a known transmission speed of the signal of the mobile telephone, the first, second and third time differences and geographic locations of the first, second and third antenna sites.

2. The method according to claim 1, wherein the database comprises a plurality of forwarding locations, wherein each of the forwarding locations has an associated landline telephone having a unique landline telephone number.

3. The method according to claim 1, wherein the forwarding locations comprise street addresses.

4. The method according to claim 1, wherein the forwarding locations comprise geographic coordinates.

5. A method of initializing a call forwarding system wherein a call originally placed to a mobile telephone number of a mobile telephone is forwarded to a landline telephone number of a landline telephone associated in a database with a forwarding location, wherein the call is forwarded when the mobile telephone is approximately at the forwarding location, the call being routed through a telephone network by a service provider, the method comprising:

(a) receiving from the landline telephone a set-up telephone call directed to a predetermined number while the mobile telephone is at the forwarding location and is powered on;

(b) upon receiving the set-up telephone call, determining the forwarding location using a mobile location technology to locate the mobile telephone using service provider equipment; and (c) creating a record in the database, the record containing the determined forwarding location associated with the landline telephone number;

wherein the mobile location technology is an angle of arrival method having the steps of:

(i) receiving a signal of the mobile telephone at a first antenna site having a first receiver and a second antenna site having a second receiver, wherein each of the receivers is capable of detecting compass direction;

(ii) determining a first angle of arrival (AOA) when the signal reaches the first receiver and a second AOA when the signal reaches the second receiver;

(iii) calculating an angular difference between the first AOA and the second AOA; and (iv) generating the current mobile telephone location expressed in longitude and latitude by using a geographic location algorithm, said geographic location algorithm being a function of the angular difference and geographic locations of the first and second antenna sites.

6. The method according to claim 5, wherein the database comprises a plurality of forwarding locations, wherein each of the forwarding locations has an associated landline telephone having a unique landline telephone number.

7. The method according to claim 5, wherein the forwarding locations comprise street addresses.

8. The method according to claim 5, wherein the forwarding locations comprise geographic coordinates.

9. A method of initializing a call forwarding system wherein a call originally placed to a mobile telephone number of a mobile telephone is forwarded to a landline telephone number of a landline telephone associated in a database with a forwarding location, wherein the call is forwarded when the mobile telephone is approximately at the forwarding location, the call being routed through a telephone network by a service provider, the method comprising:

(a) receiving from the landline telephone a set-up telephone call directed to a predetermined number while the mobile telephone is at the forwarding location and is powered on;

(b) upon receiving the set-up telephone call, determining the forwarding location using a mobile location technology to locate the mobile telephone using service provider equipment; and (c) creating a record in the database, the record containing the determined forwarding location associated with the landline telephone number;

wherein the mobile location technology is a location pattern matching method having the steps of:

(i) creating a database of standard signal characteristics from a plurality of multipath radio frequency (RF) signals generated from a known mobile telephone at a first antenna site having a first antenna, a second antenna, and a multipath RF receiver, wherein each of the standard signal characteristics are associated with a known geographic location;

(ii) receiving a signal of the mobile telephone at the first antenna site and generating a current signal characteristic;

(iii) comparing the current signal characteristic to the database of standard signal characteristics and determining a closest match signal characteristic from the standard signal characteristics; and (iv) generating the current mobile telephone location expressed in longitude and latitude by using the geographic location associated with the closest match signal characteristic in the database of standard signal characteristics.

10. The method according to claim 9, wherein the database comprises a plurality of forwarding locations, wherein each of the forwarding locations has an associated landline telephone having a unique landline telephone number.

11. The method according to claim 9, wherein the forwarding locations comprise street addresses.

12. The method according to claim 9, wherein the forwarding locations comprise geographic coordinates.

* * * * *